United States Patent
Navsariwala et al.

(10) Patent No.: US 9,971,496 B2
(45) Date of Patent: May 15, 2018

(54) METHOD AND APPARATUS FOR ADJUSTING A GRAPHICAL USER INTERFACE ON AN ELECTRONIC DEVICE

(71) Applicant: MOTOROLA MOBILITY LLC, Chicago, IL (US)

(72) Inventors: Umesh Navsariwala, Bartlett, IL (US); Deepesh Patel, Streamwood, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 487 days.

(21) Appl. No.: 14/450,626

(22) Filed: Aug. 4, 2014

(65) Prior Publication Data
US 2016/0034140 A1    Feb. 4, 2016

(51) Int. Cl.
G06F 3/0488    (2013.01)
G06F 3/044     (2006.01)

(52) U.S. Cl.
CPC ............ *G06F 3/0488* (2013.01); *G06F 3/044* (2013.01)

(58) Field of Classification Search
CPC ................................. G06F 3/0488; G06F 3/044
See application file for complete search history.

(56) References Cited

U.S. PATENT DOCUMENTS

| H0716 H | 12/1989 | McDonald et al. |
|---|---|---|
| 6,491,630 B1 | 12/2002 | Saccardo et al. |
| 6,538,636 B1 | 3/2003 | Harrison |
| 7,068,256 B1 | 6/2006 | Gettemy et al. |
| 7,218,313 B2 | 5/2007 | Marcus et al. |
| 7,653,883 B2 | 1/2010 | Hotelling et al. |
| 7,800,592 B2 | 9/2010 | Kerr et al. |
| 8,098,233 B2 | 1/2012 | Hotelling et al. |
| 8,103,263 B2 | 1/2012 | Shim et al. |
| 8,390,481 B2 | 3/2013 | Pance et al. |
| 8,504,934 B1 | 8/2013 | Yu et al. |
| 9,013,397 B2 | 4/2015 | Hiramoto |
| 9,215,302 B2 | 12/2015 | Thorson et al. |
| 9,367,085 B2 | 6/2016 | Alberth, Jr. et al. |
| 2002/0107055 A1 | 8/2002 | Yamazaki et al. |
| 2003/0234768 A1 | 12/2003 | Rekimoto et al. |
| 2004/0036680 A1 | 2/2004 | Davis et al. |

(Continued)

FOREIGN PATENT DOCUMENTS

| CN | 101266516 A | 9/2008 |
|---|---|---|
| CN | 101916161 A | 12/2010 |

(Continued)

OTHER PUBLICATIONS

"Stock XOOM Browser Quick Controls", Mar. 2011, retrieved from xoomforms.com, 6 pp.

(Continued)

*Primary Examiner* — Li Sun
(74) *Attorney, Agent, or Firm* — Shumaker & Sieffert, P.A.

(57) ABSTRACT

A method for adjusting a graphical user interface on an electronic device includes receiving, from a detection element positioned at a backside of an electronic device, first data generated when a hand is positioned at the backside of the electronic device. Further, a one-handed or two-handed operation of the electronic device is determined based on the first data. A displaying of a graphical user interface on the electronic device is adjusted when the one-handed operation is determined.

15 Claims, 9 Drawing Sheets

(56) References Cited

U.S. PATENT DOCUMENTS

| | | |
|---|---|---|
| 2005/0154798 A1 | 7/2005 | Nurmi |
| 2005/0159850 A1 | 7/2005 | Melman |
| 2006/0026535 A1 | 2/2006 | Hotelling et al. |
| 2006/0038774 A1 | 2/2006 | Mese et al. |
| 2006/0192724 A1 | 8/2006 | Kezys et al. |
| 2006/0197750 A1 | 9/2006 | Kerr et al. |
| 2006/0197753 A1 | 9/2006 | Hotelling |
| 2007/0010211 A1 | 1/2007 | Mixon |
| 2007/0236460 A1 | 10/2007 | Young et al. |
| 2007/0291831 A1 | 12/2007 | Lee |
| 2009/0069045 A1 | 3/2009 | Cheng |
| 2009/0143106 A1 | 6/2009 | Meitzler et al. |
| 2009/0160792 A1 | 6/2009 | Morohoshi et al. |
| 2009/0259969 A1 | 10/2009 | Pallakoff |
| 2010/0013651 A1 | 1/2010 | Spalink |
| 2010/0045705 A1 | 2/2010 | Vertegaal et al. |
| 2010/0097331 A1 | 4/2010 | Wu |
| 2010/0103098 A1 | 4/2010 | Gear et al. |
| 2010/0120466 A1 | 5/2010 | Li |
| 2010/0123675 A1 | 5/2010 | Ippel |
| 2010/0134423 A1 | 6/2010 | Brisebois et al. |
| 2010/0153313 A1 | 6/2010 | Baldwin et al. |
| 2010/0315348 A1 | 12/2010 | Jellicoe et al. |
| 2011/0065392 A1 | 3/2011 | Chung |
| 2011/0141120 A1 | 6/2011 | Platzer et al. |
| 2011/0197158 A1 | 8/2011 | Tseng et al. |
| 2011/0234487 A1 | 9/2011 | Hiramoto |
| 2011/0242138 A1 | 10/2011 | Tribble |
| 2011/0314429 A1 | 12/2011 | Blumenberg |
| 2012/0026110 A1 | 2/2012 | Yamano |
| 2012/0062387 A1 | 3/2012 | Vik et al. |
| 2012/0071203 A1 | 3/2012 | Wong |
| 2012/0075249 A1 | 3/2012 | Hoch |
| 2012/0113007 A1 | 5/2012 | Koch et al. |
| 2012/0117506 A1 | 5/2012 | Koch et al. |
| 2012/0138441 A1 | 6/2012 | Kim et al. |
| 2012/0188174 A1 | 7/2012 | Migos et al. |
| 2012/0206556 A1 | 8/2012 | Yu et al. |
| 2012/0315954 A1 | 12/2012 | Ahn et al. |
| 2013/0021293 A1* | 1/2013 | Nakai .................. G06F 1/1626 345/174 |
| 2013/0034066 A1 | 2/2013 | Kakishima |
| 2013/0035139 A1 | 2/2013 | Sheynblat et al. |
| 2013/0038564 A1 | 2/2013 | Ho |
| 2013/0093680 A1 | 4/2013 | Ogita |
| 2013/0196596 A1* | 8/2013 | Parekh ................. G06F 1/1643 455/41.1 |
| 2013/0237272 A1 | 9/2013 | Prasad |
| 2013/0300668 A1* | 11/2013 | Churikov ............... G06F 3/041 345/168 |
| 2013/0307801 A1 | 11/2013 | Nam |
| 2013/0317921 A1* | 11/2013 | Havas ................ G06Q 30/0633 705/15 |
| 2014/0032165 A1 | 1/2014 | Sarrafzadeh et al. |
| 2014/0068492 A1 | 3/2014 | Yu et al. |
| 2014/0078094 A1* | 3/2014 | Yang ..................... G06F 3/0418 345/174 |
| 2014/0184171 A1* | 7/2014 | Lee ....................... H02J 7/0055 320/138 |
| 2014/0187204 A1 | 7/2014 | Hartmann |
| 2014/0189551 A1 | 7/2014 | Kim |
| 2014/0208128 A1 | 7/2014 | Gyorfi et al. |
| 2015/0002350 A1 | 1/2015 | Vance |
| 2015/0236758 A1* | 8/2015 | Choi ....................... H04B 5/02 455/41.1 |

FOREIGN PATENT DOCUMENTS

| | | |
|---|---|---|
| EP | 2360560 A1 | 8/2011 |
| EP | 2175344 A3 | 2/2012 |
| EP | 2515593 A2 | 10/2012 |
| JP | 2007179502 A | 7/2007 |
| WO | 2010071188 A1 | 6/2010 |

OTHER PUBLICATIONS

Andol, "Hand gesture detection and recognition using openCV," retrieved from www.andol.info/hci/895.htm, Jan. 26, 2012, 8 pp.

Hinckley, "Sensing Techniques for Mobile Interaction," UIST 2000 Proceedings of the 13th annual ACM symposium on User interface software and technology, 10 pp.

Stevens, "EyeSight's hand-waving, gesture-based UI now available for Android (video)," AOL Inc., retrieved from http://www.engadget.com/2010/06/08/eyesights-hand-waving-gesture-based-ui-now-available-for-andro/, Jan. 26, 2012, 4 pp.

Sy, Designing IR gesture-sensing systems, online version of Electronics Design, Strategy, News, retrieved from http://www.edn.com/article/print/518437-Designing_IR_gesture_sensing_systems.php, Jan. 26, 2012, 4 pp.

Wikipedia, "Gesture recognition," retrieved from http://en_wikipedia.org/wiki/Gesture_recognition, Jan. 26, 2012, 7 pp.

Wimmer, et al., "HandSense—Discriminating Different Ways of Grasping and Holding a Tangible User Interface," TEI 2009, Feb. 16-18, 2009, 4 pp.

Hinckley et al., "Sensing Techniques for Mobile Interaction", UIST 2000 Proceedings of the 13th annual ACM symposium on User interface software and technology, 2000, 10 pgs.

* cited by examiner

METHOD AND APPARATUS FOR ADJUSTING A GRAPHICAL USER INTERFACE ON AN ELECTRONIC DEVICE

FIELD OF THE DISCLOSURE

The present disclosure relates to adjusting a graphical user interface, and more particularly to a method and apparatus for adjusting a graphical user interface on an electronic device when a one-handed operation is performed on the electronic device.

BACKGROUND

Modern electronic devices come in many different shapes and size. Users hold these devices using different types of grips and orientations. Further, users sometimes multitask when operating an electronic device. Thus, a user may hold a device and type or surf the web with one hand, and simultaneously use the other hand for another purpose. If the user is operating an electronic device with one hand, portions of a touchscreen of the electronic device are less accessible to the user's hand that is performing gestures on the device. As device sizes increase, more of the electronic device touch screen becomes inaccessible to the user performing one-handed operations on the device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides a method for adjusting a graphical user interface on an electronic device. The method includes receiving, from a detection element positioned at a backside of the electronic device, first data generated when a hand is positioned at the backside of the electronic device. The method also includes determining, based on the first data, whether there is a one-handed operation of the electronic device, and adjusting a displaying of a graphical user interface on the electronic device when the one-handed operation is determined.

Further in accordance with the teachings provided herein is an electronic device having a detection element disposed at a backside of the electronic device and a processor coupled to the detection element. The detection element is configured to generate first data in response to a hand positioned at the backside of the electronic device. The processor is configured to receive the first data and determine, based on the first data, whether there is a one-handed operation of the electronic device. Further, the processor adjusts a displaying of a graphical user interface of the electronic device when the one-handed operation is determined.

When a one handed operation is determined, a display of the graphical user interface is adjusted such that items displayed on the graphical user interface are moved to a location of the touchscreen that is more accessible to a user engaged in a one-handed operation of the electronic device. For example, if a user is engaged in a one-handed operation with a right hand, icons displayed on the touchscreen are moved to a lower right portion of the touchscreen making the icons more accessible to the right hand of the user. Further, only the icons are adjusted, the rest of the touchscreen remains unadjusted. Thus, portions of the graphical user interface are adjusted for ease of hand manipulation while the remainder of the graphical user interface is left unadjusted for ease of viewing.

Figure 1:
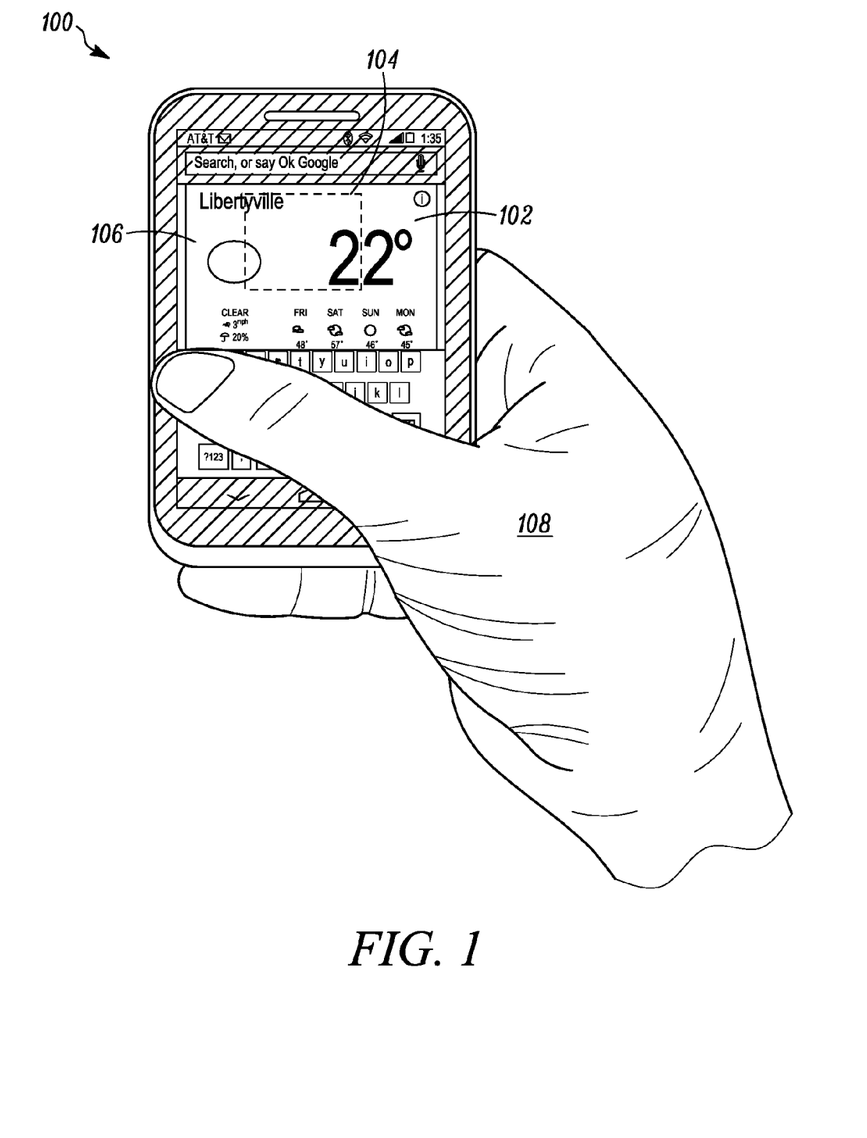
FIG. 1 is a diagram of an electronic device configured to implement embodiments of the present teachings.

Referring now to the drawings and in particular to FIG. 1, which illustrates an electronic device 100, also referred to herein simply as a device, in a hand 108 of a user of the electronic device 100. The electronic device 100 is configured to implement embodiments of the present teachings. Although the device 100 depicted in FIG. 1 is a smartphone, embodiments disclosed herein are not limited to smartphones but may be implemented on any other type of electronic device, of various sizes, wherein a user can hold the device and operate the device using one hand or two hands. In some examples, instead of a smartphone, the electronic device 100 is a cellular phone, a phablet, a tablet, a personal digital assistant, a mobile phone, a media player, or any other handheld device that can display a graphical user interface (GUI).

The electronic device 100 includes a touchscreen display 106, or simply touchscreen, which is a hardware display component or display hardware configured as both a user input and an output component. For example, the touchscreen 106 is configured as a user output component to display a graphical user interface 102 and as a user input component to receive tactile or touch inputs from the user. As used herein, a graphical user interface or GUI means a collection of one or more images or objects presented or displayed by the display hardware, wherein at least some of the images or objects can be interacted with by a user providing input via the display hardware.

Examples of images or objects that are a part of the GUI include, for instance, a virtual keyboard (shown in FIG. 1), one or more icons (not shown in FIG. 1), one or more letters or numbers such as dates and times, or other images or objects, which may or may not facilitate receiving user input. The user inputs are illustratively in the form of gestures or movements on or over the touchscreen 106 with a finger or other instrument such as a stylus, and particularly on or over images or objects of the GUI 102. The user inputs facilitate operations such as selections, taps, swipes, drag and drop, and the like used to manipulate or provide tactile input using objects of the GUI 102 displayed on the touchscreen 106. As shown, the touchscreen 106 is a primary component for receiving user input. In other embodiments, the electronic device 100 contains multiple hardware components for receiving inputs by a user including, by way of example, the touchscreen 106 and a physical keyboard (not shown).

Moreover, in the example illustrated in FIG. 1, the user is using the hand 108 to simultaneously hold and interact with and operate the electronic device 100, which is deemed and referred to herein as a one-handed operation. As specifically shown in FIG. 1, the user performs a one-handed operation of the electronic device 100 by simultaneously holding the device 100 and interacting with the virtual keyboard of the GUI 102 displayed on the touchscreen 106.

Particularly, during the one-handed operation of the electronic device 100, the thumb of the hand 108 holding the device 100 can be used to interact with and operate the device 100, for example by performing gestures or other motions on the touchscreen 106. Where the thumb is the predominant instrument of interaction with the touchscreen 106, the area of the touchscreen 106 that is reachable is, thus, limited by the thumb's reach. Accordingly, when looking from the perspective of a right-handed user, a leftmost portion of the touchscreen 106 is more difficult to reach when using the one-handed operation. In another example, if the user performs a one-handed operation using the left hand, the rightmost portion of the touchscreen 106 is not easily reachable. Other factors that influence which areas of a touchscreen are accessible when operating the electronic device 100 in a one-handed manner include, but are not limited to: how a user holds the electronic device 100; the size of a user's hand 108; the size of the touchscreen 106; and the size of the device 100.

By contrast, a two-handed operation means that the user uses both hands to hold and operate the device. For one type of two-handed operation, the user holds the electronic device 100 with one hand and operates the device 100 with the other hand. For another type of two-handed operation, the user uses both hands to simultaneously hold and operate the electronic device 100. Moreover, handedness is defined herein by reference to the hand used to hold and operate the electronic device 100 to facilitate the one-handed operation. Thus, a user that uses the left hand during a one-handed operation of an electronic device 100 is deemed as performing a left-handed operation of the device 100. Whereas, a user that uses the right hand during a one-handed operation of an electronic device 100 (as is shown in FIG. 1) is deemed as performing a right-handed operation of the device 100.

As further shown in FIG. 1, the device 100 includes a detection element 104. The detection element 104 is shown as a dashed block because it is positioned at or near a backside of the electronic device 100. In one example, the detection element 104 is positioned in a housing of the electronic device 100 such that at least a portion of the detection element 104 is disposed directly adjacent to an internal portion of the backside of the housing. A backside of an electronic device is an opposing side to a frontside of the device, wherein the frontside of the device 100 is shown in FIG. 1 and contains the display, in this case the touchscreen 106, of the device 100. In accordance with the present teachings, the detection element 104 is used to detect, estimate, or otherwise indicate positioning of the hand 108, and in a particular embodiment positioning of the fingers of the hand 108, relative to the detection element 104.

Figure 2:
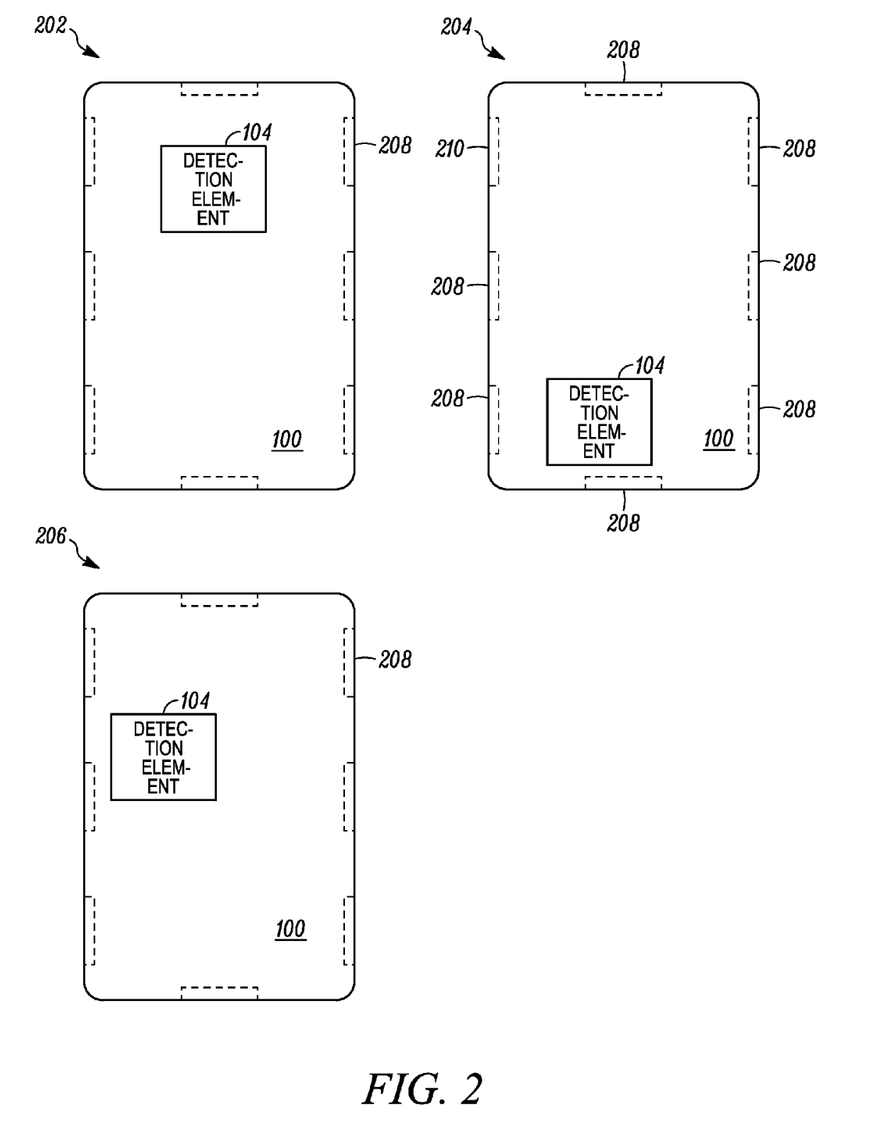
FIG. 2 illustrates various positions of a detection element at a backside of an electronic device.

The location of the detection element 104 relative to the backside of the electronic device 100 is not limited to that shown in FIG. 1. For example, FIG. 2 shows views 200, which illustrate various general positions or locations of the detection element 104 at or relative to the backside of the electronic device 100, for instance when the electronic device 100 is positioned face-down instead of face-up as in FIG. 1. More particularly, a view 202 shows the detection element 104 in or substantially in an upper center or central portion of the backside of the electronic device 100. A view 204 shows the detection element 104 in or substantially in a lower left portion of the backside of the electronic device 100. A view 206 shows the detection element 104 in or substantially in a central left portion of the backside of the electronic device 100. The particular position of the detection element 104 can be determined based on, for instance, the size of the device, the location of the screen on the device, the location of an area of the screen upon which the GUI is displayed, etc. Moreover, in other embodiments, the detection element 104 is positioned at locations of the backside of the electronic device 100 other than what is shown in FIG. 2.

Also depicted in FIG. 2 is a set of sensors 208 disposed at a periphery or one or more outer edges of the electronic device 100. A set, as referred to herein, is one or more of a particular item. The sensors 208 can be configured to provide data to a processor, for instance, wherein the data indicates and can be used by the processor to determine left-handed operation or right-handed operation of the electronic device 100, for example upon determining one-handed operation in accordance with the present teachings. In one embodiment, the sensors 208 are capacitive sensors that contain capacitive elements used to determine user handedness.

In accordance with another embodiment, the sensors 208 are multiple antennas positioned around the perimeter of the device 100 that can be used to determine handedness. The antennas 208 are configured to respond to information signals, such as radio frequency signals, to communicate any variety of information such as data, voice, text, video, etc. Moreover, the antennas 208 can be configured to communicate via a multitude of communication frequencies, such as those employed for: cellular communications, such as Global System for Mobile Communications (GSM), Code Division Multiple Access (CDMA), Wideband CDMA (WCDMA), or Long Term Evolution (LTE); location or other satellite communications, such as Global Positioning System (GPS); local area networking, such as Bluetooth; Worldwide Interoperability for Microwave Access (WiMax) and Wireless Fidelity (WiFi); broadcast services; or any combination thereof.

In accordance with this embodiment where the antennas operate as the sensors 208, the antennas experience detuning in a wireless communication link as a result of a change in impedance, caused by objects such as fingers positioned near the antennas 208. Depending on how a hand and its fingers are positioned on the electronic device 100, different ones of the antenna experience a differing amount of detuning. In this manner, for instance, the location of the fingers in relation to one or more of the antennas 208, and correspondingly handedness, is identifiable based on an amount of detuning that occurs in one or more of the antennas 208.

One or more of the dashed rectangles illustrated at the periphery of the device 100, in some examples, also depicts a location of a button for performing such functions as volume adjustment, camera operation, and the like. For instance, the dashed rectangle labeled 210 illustratively represents a volume adjustment button, a button for operating a camera, or a button that provides input to an application. Although the views 202, 204, 206 illustrated in FIG. 2 show some example locations of the sensors 208 and the button 210, in other embodiments the sensors 208 and/or button 210 can be located in other areas around the periphery of the device 100.

Figure 3:
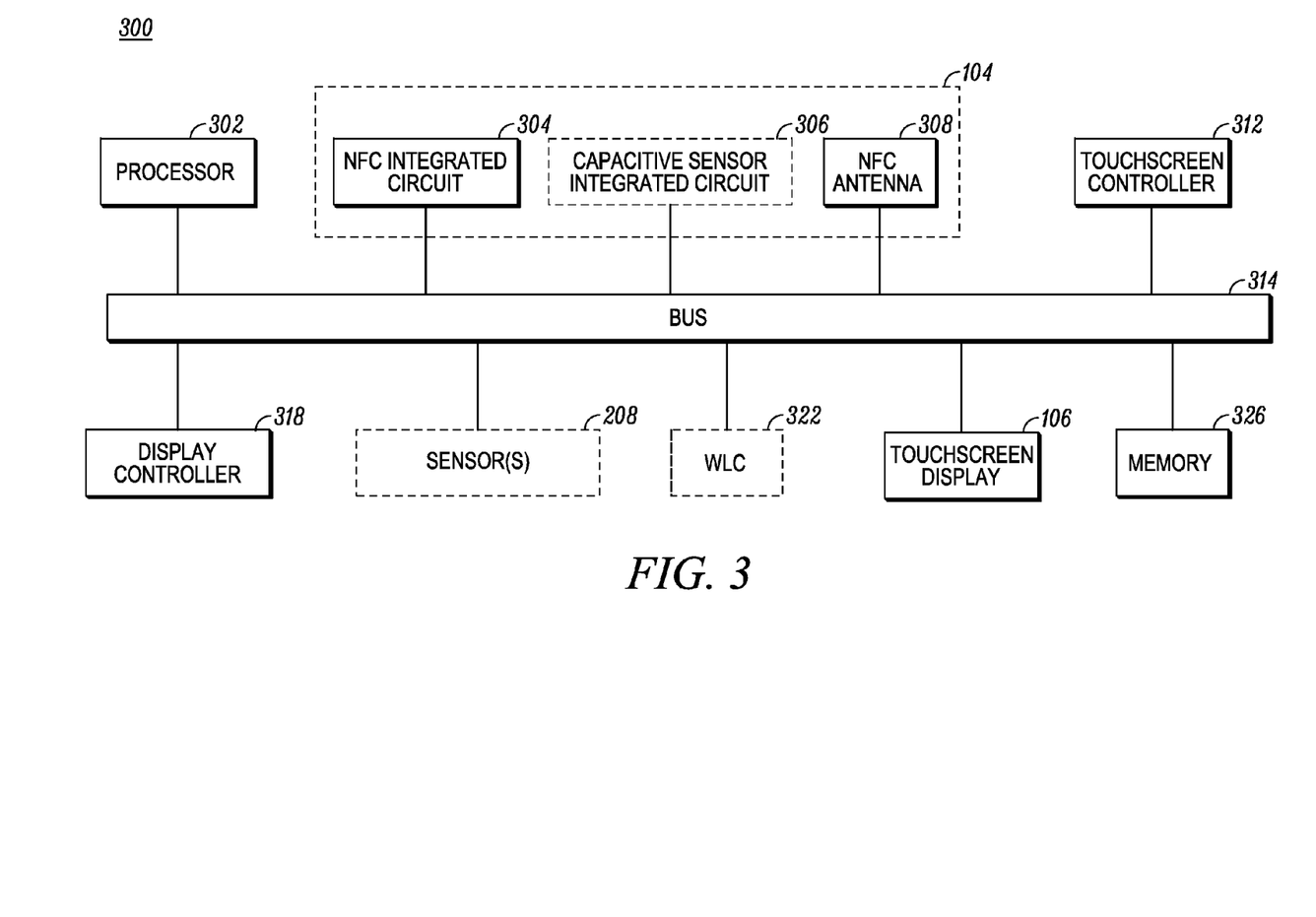
FIG. 3 is a block diagram illustrating example internal components of an electronic device configured in accordance with the present teachings.

Turning now to FIG. 3, which shows a block diagram illustrating example internal hardware components 300 of a wireless communication device, such as the electronic device 100 of FIG. 1, in accordance with the present teachings. As shown in FIG. 3, the internal hardware elements or components 300 include: a processor 302, the detection element 104, a touchscreen controller 312, a display controller 318, the touchscreen display 106, and memory 326, which are operatively interconnected by internal hardware such as a bus 314. The components 300 might also include one or more of the following: one or more sensors 208 such as those described above; and a wireless charging component (WLC) 322.

A limited number of device components 302, 104, 312, 314, 318, 208, 322, 106, and 326 are shown for ease of illustration, but other embodiments can include a lesser or greater number of such components in a device, such as the device 100. Moreover, other elements needed for a commercial embodiment of a device that incorporates the components shown at 300 are omitted from FIG. 3 for clarity in describing the enclosed embodiments. Such elements include, by way of example and not limitation, a cellular transceiver, a wireless local area network transceiver, one or more microphones and speakers, a battery, additional input and output components, one or more interfaces to external devices, other types of sensors, etc.

We now turn to a brief description of the hardware components 300. In general, the processor 302 is configured with functionality in accordance with embodiments of the present disclosure as described in detail below with respect to the remaining figures. Such functionality is supported by the other hardware shown in FIG. 3, including the device components 104, 312, 314, 318, 208, 322, 106, and 326. A component referred to herein as being "adapted," "operative," "capable," "configured," or similar terminology, means that the indicated component is, at a minimum, implemented using hardware to perform its desired functionality. However, in some configurations, the hardware can be programmed with software and/or firmware as the means for the indicated component to implement its desired functionality.

The processor 302, for instance, includes arithmetic logic and control circuitry necessary to perform the digital processing, in whole or in part, for the electronic device 100 to determine one-handed or two-handed operation and to resultantly control the changing of a GUI, in accordance with described embodiments. For one embodiment, the processor 302 represents a primary microprocessor, also referred to as a central processing unit (CPU), of the electronic device 102. For example, the processor 302 can represent an application processor of a smartphone. In another embodiment, the processor 302 is an ancillary processor such as a graphics processor or a low power sensory processor for the display controller 318, separate from the CPU, wherein the ancillary processor is dedicated to providing the processing capability, in whole or in part, needed for the device components 300 to perform at least some of their intended functionality.

The memory component 326 stores data that includes, but need not be limited to, operating systems, programs (applications), and informational data used by the processor 302 in performing its functionality. The information data includes, for instance, data received from the detection element 104 and optionally from the sensors 208, which indicates the position of the hand 108 relative to the electronic device 100. In one embodiment, the memory 326 represents random access memory (RAM). In other embodiments, the memory 326 represents volatile or non-volatile memory.

The detection element 104 can be arranged into a number of different physical configurations to detect a hand or portions of the hand positioned at the backside of the electronic device 100 and to present data representative of such detection to the processor 302. In one example arrangement, the detection element 104 includes a near field communication (NFC) integrated circuit (IC) 304 coupled to an NFC antenna 308, the operation of which is described below by reference to FIG. 5. The NFC IC 304 and NFC antenna 308 operate consistent with a set of NFC standards, such as International Organization for Standardization/International Electrotechnical Commission (ISO/IEC) 18092 by way of example only, to facilitate establishing and performing radio communication between devices by touching them or bringing them into close proximity, where close proximity is no more than a few inches. In another arrangement, the detection element 104 includes a capacitive sensor IC 306 coupled to the NFC antenna 308, the operation of which is described below by reference to FIG. 6. In yet another arrangement, the detection element 104 includes one or more sensors, for instance one or more capacitive sensors (not shown).

The WLC 322 is a charging element used to inductively charge the battery of the electronic device 100. The WLC 322 operates in conjunction with a charging station (not illustrated). The charging station sends energy to the electronic device 100 through inductive coupling. The device 100 uses that energy to charge the battery of the device 100 or otherwise power the device 100. In one implementation scenario, the WLC 322 is co-located with the NFC IC 304 and NFC antenna 308 to enable inductive charging using an inductive coil of the NFC antenna 308.

The sensors 208 include, for example, the antennas or capacitive sensors at the periphery of the electronic device 100 as described above. The sensors 208 may alternatively or additionally be configured as proximity sensors (e.g., a light detecting sensor, an ultrasound transceiver, or an infrared transceiver), touch sensors, altitude sensors, an accelerometer, a tilt sensor, a gyroscope, or an orientation detection element (which can include one or more of the above-mentioned types of sensors or other types of orientation sensors), to name a few. Using one or more of these types of sensors, the electronic device 100 is configured to detect an orientation of the device 100 as well as handedness.

The touchscreen display 106 visually displays information and receives tactile input from a user using, for instance, resistive or capacitive sensing technologies. To process user input, the touchscreen controller 312 provides or reports data to the processor 302 representative of the user tactile input sensed by the touchscreen display 106. The processor 302 processes the data from the touchscreen controller 312 to interpret the user input. To visually display information, such as the GUI, the processor 302 provides data representing the GUI or adjustments and changes to the GUI 102 to the display controller 318, which physically controls the pixels of the display 106 to present the GUI. In this manner, the processor 302 can be said to control, adjust, or change, the displaying of the GUI on the electronic device 100 in accordance with the present teachings as further described by reference to the remaining FIGS. 4-9.

Figure 4:
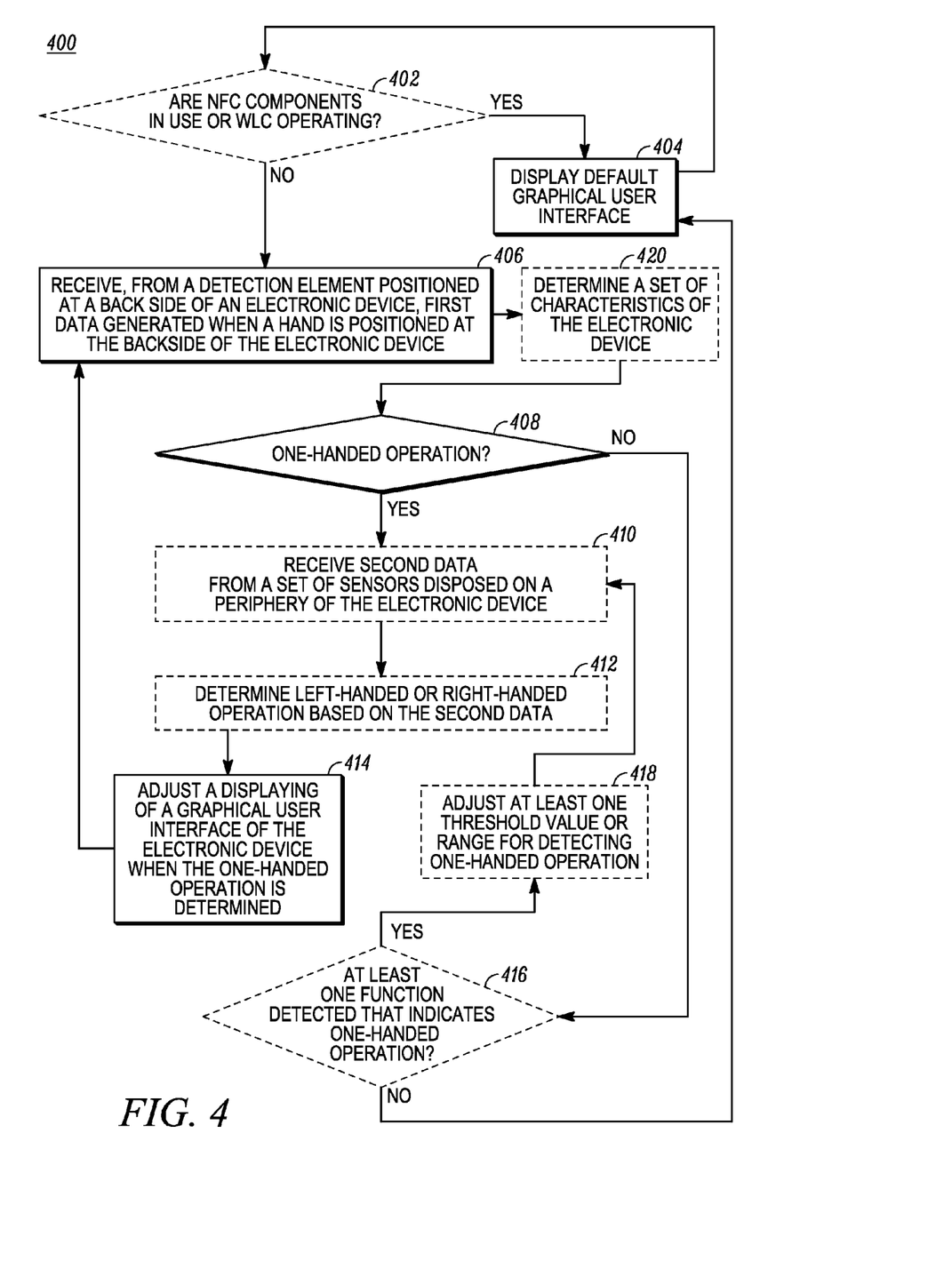
FIG. 4 is a logical flow diagram illustrating a general method of adjusting a graphical user interface on an electronic device in accordance with the present teachings.

Particularly, FIG. 4 illustrates one example of a logical flow diagram 400 representing a general method of adjusting a graphical user interface of an electronic device, such as the device 100, in accordance with the present teachings. In one embodiment, the processor 302 implements functionality in accordance with at least some portion of the method, for instance with support from one or more other components 300 illustrated in FIG. 3. Where the device 100 includes a detection element 104 that doesn't require the use of the NFC antenna 308, the method illustratively starts at functional block 406.

However, where the detection element 104 incorporates the NFC antenna 308, the method starts at functional block 402 where the device 100 determines whether the detection element 104 (that includes the NFC components 304 and 308) is being used for near field communication with an external device or whether the WLC component 322 is operating to, for instance, facilitate wireless charging of the device 100. If either of these two conditions exists, the device 100 is unable to use the NFC antenna 308 to implement the present teachings. Moreover, if either of these two conditions exists, another object such as a charging station, a point-of-sale device, or a peripheral device is positioned near the antenna 308 at the backside of the device 100 instead of the user's hand 108. Therefore, the device 100, for instance through the directing of the processor 302, displays 404 a default GUI when the detection element 104 is already in use or the WLC component 322 is operating on the electronic device 100. A default GUI is a GUI that has not been adjusted based on or in consideration of how one or both of the user's hands are positioned on the device 100. Example default GUIs are shown at views 1002 and 1004 of FIG. 10.

Where the device 100 isn't using the NFC antenna 308 for near field communications or wireless charging, the processor 302 receives 406 from the detection element 104 data generated by the detection element 104 in response to sensing a hand, e.g., the hand 108, positioned at the backside of the device 100. The processor 302 uses the data from the detection element 104 to determine 408 whether there is a one-handed operation of the device. The data provided to the processor 302 from the detection element 104 is referred to herein as "first data" to distinguish it from data provided by other components of the device 100 such as the sensors 208. Correspondingly, the data provided to the processor 302 from other components of the device 100 such as the sensors 208 is referred to herein as "second data." The form, type, range, etc., of the first data received by the processor 302 depends at least in part on the particular embodiment of the detection element 104.

Figure 5:
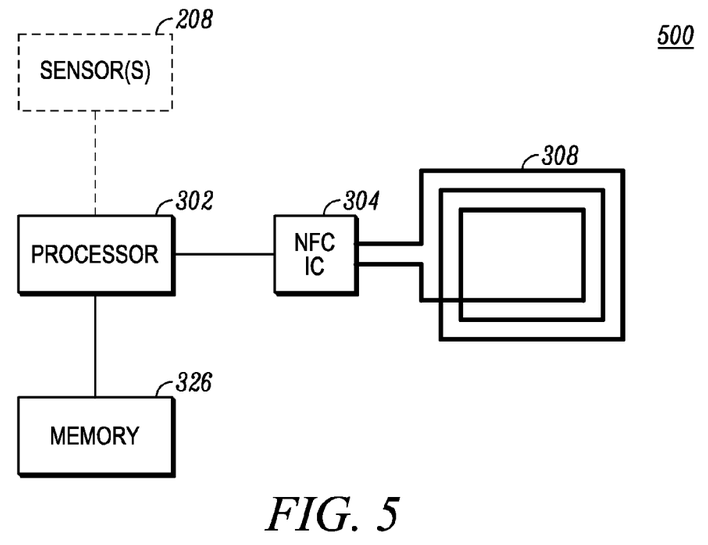
FIG. 5 is a schematic diagram illustrating one embodiment of a detection element in accordance with the present teachings.

For a first embodiment of the detection element 104 illustrated in FIG. 5, receiving the first data from the detection element 104 includes receiving the first data from the near field communication integrated circuit 304 coupled to the near field communication antenna 308. Particularly, FIG. 5 shows apparatus 500, which includes the processor 302 coupled to the NFC IC 304, which in turn is coupled to the NFC antenna 308. The NFC antenna 308 is depicted as an inductor coil. Apparatus 500 further illustrates the processor 302 coupled to the memory 326 and optionally coupled to the sensors 208.

Using the apparatus 500, the device 100 can perform the functionality shown in blocks 406 and 408 of flow diagram 400 as follows. The processor 302 initiates a diagnostic mode of the NFC IC 304. The diagnostic mode allows for the NFC IC 304 to measure a field strength from the NFC antenna 308 during the time the NFC IC 304 is in diagnostic mode. First data provided to the processor 302 by the NFC IC 304 indicates the one-handed operation when the measured field strength is within a first range of field strength values and can indicate another manner of operation of the device 100 when the measured field strength is outside of the first range of field strength values. For example, the first data could indicate the two-handed operation of the device 100 or operation of the device 100 when it is laying on a surface other than a person's hand when the measured field strength is outside of the first range of field strength values.

For one example, the processor 302 sends a digital signal to the NFC IC 304 to cause the NFC IC 304 to perform in the diagnostic mode. During the diagnostic mode, the NFC IC 304 excites current pulses through the NFC antenna 308 to induce a magnetic field, which the NFC IC 304 is configured to measure. The NFC IC 304 could take a single measurement or could take multiple measurements over a designated time period, which are averaged to provide an average field strength measurement. In one example implementation scenario, the NFC IC 304 determines, based on the value of the measured magnetic field strength, whether a user is performing a one-handed operation of the device 100, a two-handed operation of the device 100, or if the device 100 is laying on another surface during operation.

Figure 7:
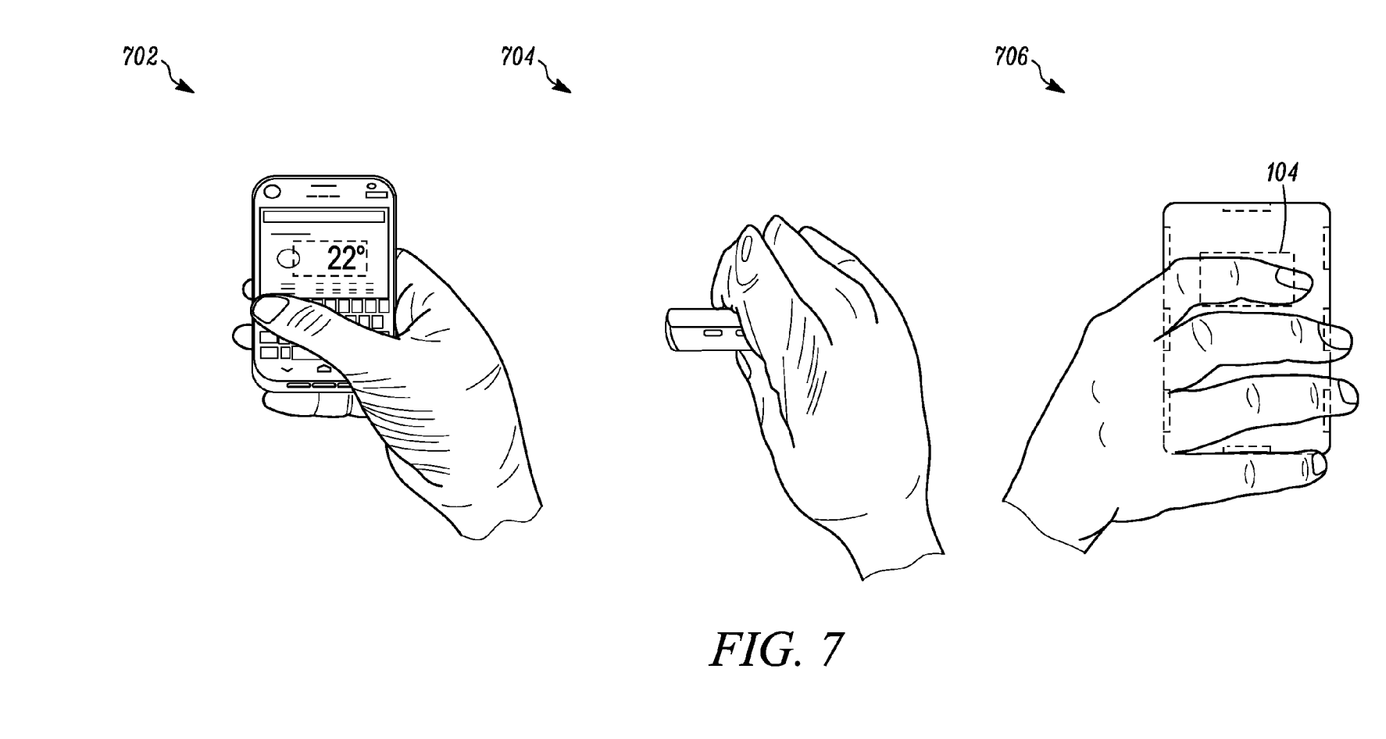
FIG. 7 illustrates views that show a user's hand position relative to a detection element while the user is performing a one-handed operation of an electronic device.
Figure 8:
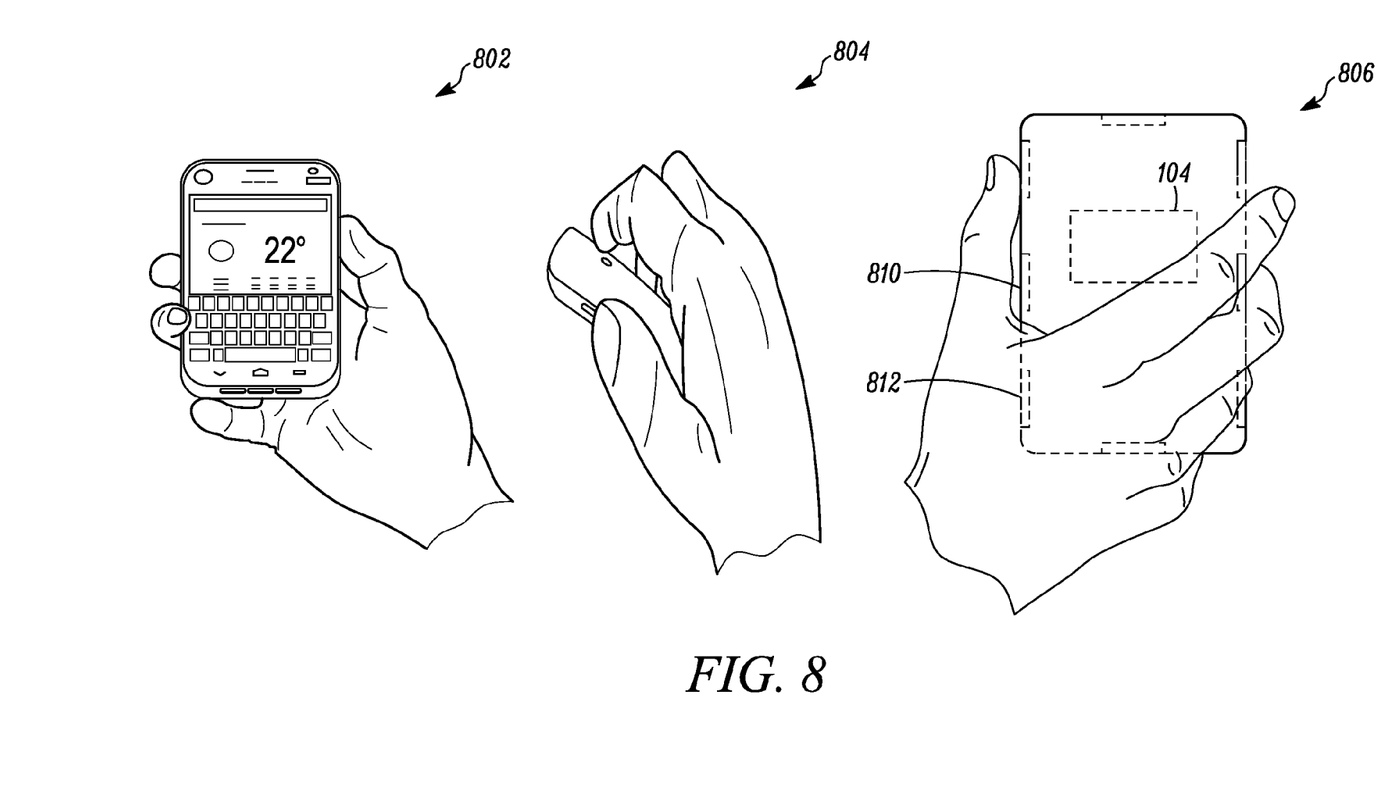
FIG. 8 illustrates views that show a user's hand position relative to a detection element while the user is performing a first type of two-handed operation of an electronic device.
Figure 9:
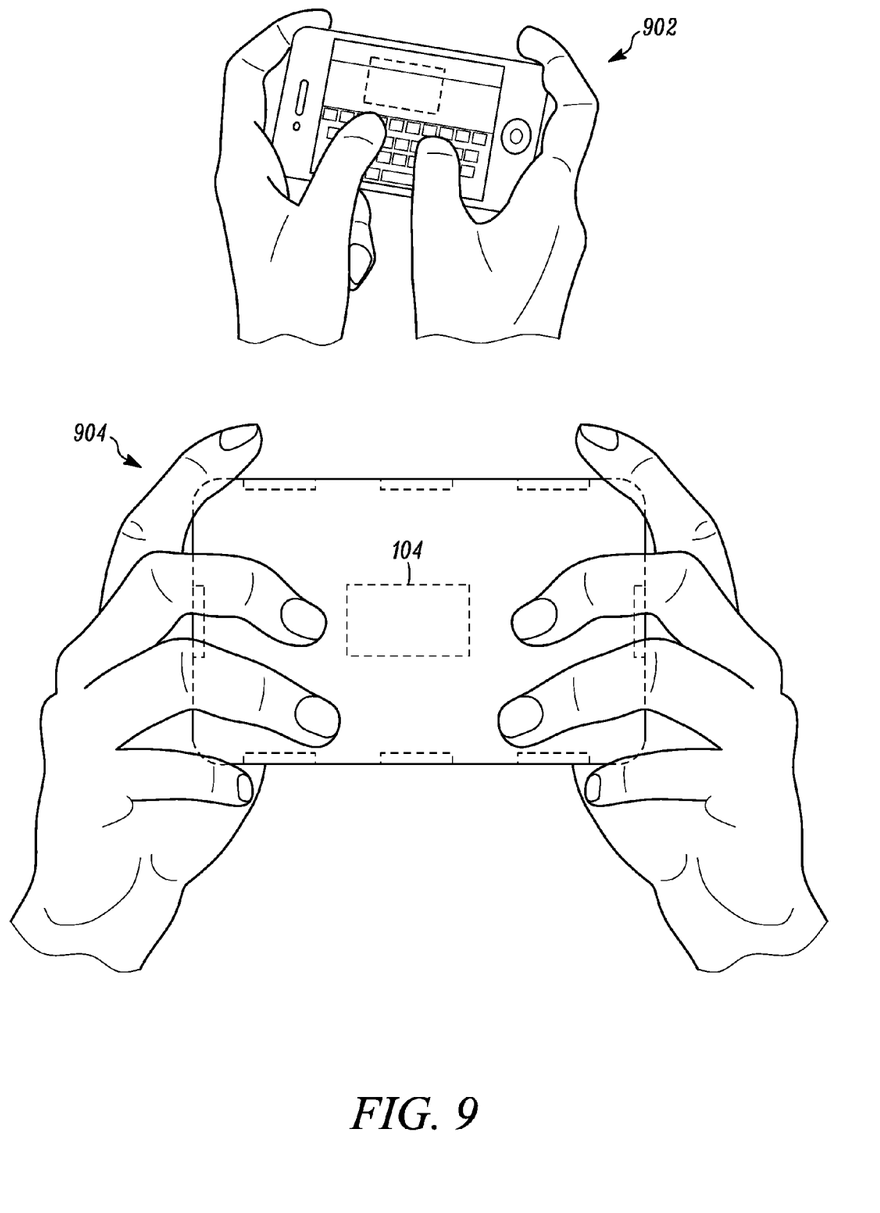
FIG. 9 illustrates views that show a user's hand position relative to a detection element while the user is performing a second type of two-handed operation of an electronic device.

More particularly, how the user operates the electronic device 100 and, thus, how the hand 108 is positioned at the backside of the electronic device 100 impacts the magnetic field strength readings. FIG. 7 illustrates views 702, 704, and 706 that show a user's hand position relative to the detection element 104 while the user is performing a one-handed operation of an electronic device. FIG. 8 illustrates views 802, 804, and 806 that show a user's hand position relative to the detection element 104 while the user is performing a first type of two-handed operation of an electronic device, wherein the user holds the device in one hand and operates the device using the other hand. FIG. 9 illustrates views 902 and 904 that show a user's hand position relative to the detection element 104 while the user is performing a second type of two-handed operation of an electronic device, wherein the user holds and operates the device using both hands.

As can be seen, the user's fingers are positioned differently at the backside of the device relative to the detection element 104 depending on the particular grip. More particularly the views 702, 704, and 706, corresponding to the one-handed operation, illustrate that the user's fingers are closer to the back surface of the device and may also be closer together than the user's fingers during a two-handed operation of the device, as shown in the views 802, 804, 806, 902, and 904. Moreover, during the one-handed operation, the user's fingers can cover or overlap more area of the detection element 104 than during either type of two-handed operations of the device. Accordingly, during the one-handed operation, the user's fingers load the NFC antenna 308 more than during the two-handed operation. This loading of the NFC antenna 308 changes the magnetic field strength output from the NFC antenna 308, which is detectable and can be used to determine how the user is holding the device, namely whether the user is performing a one-handed or a two-handed operation of the device.

In one particular arrangement, memory within or coupled to the NFC IC 304 stores a table or some other data structure having one or more ranges of field strength values, wherein each range corresponds to a different manner of operating the device 100. Namely, a first range of magnetic field strength values between 18 amperes per meter (A/m) and 20 A/m corresponds to the one-handed operation of the device 100. A second range of magnetic field strength values between 15 A/m and 18 A/m could correspond to the two-handed operation of the device 100; and different ranges of magnetic field strength values can be used to determine whether a user is holding and operating the device 100 with both hands or holding the device 100 with one hand and operating the device 100 with the other hand. A third range of magnetic field strength values between 10 A/m and 15 A/m could correspond to the user operating the device 100 as it sits on a surface.

In another example, the NFC IC 304 could translate the magnetic field strength to a different range of dimensionless numbers. For example, a first range of magnetic field strength values is illustratively translated to a range of 10 to 12, which corresponds to the one-handed operation of the device 100. A second range of magnetic field strength values could be translated to a range of 9 to 10, which illustratively corresponds to the two-handed operation of the device 100. A third range of magnetic field strength values could be translated to a range of 8 to 9, which corresponds to the user operating the device 100 as it sits on a surface. These ranges are only given as an example.

Alternatively, upon measuring the magnetic field strength induced in the NFC antenna 308, the NFC IC 304 sends the field strength measurement, as the first data, to the processor 302. The processor 302 then uses the field strength measurement to determine 408 whether there is a one-handed operation or otherwise of the device 100. To make the determination 408, the processor 302 uses, for instance, a table or some other data structure stored in the memory 326, which contains one or more ranges of field strength values, wherein each range corresponds to a different manner of operating the device 100.

Figure 6:
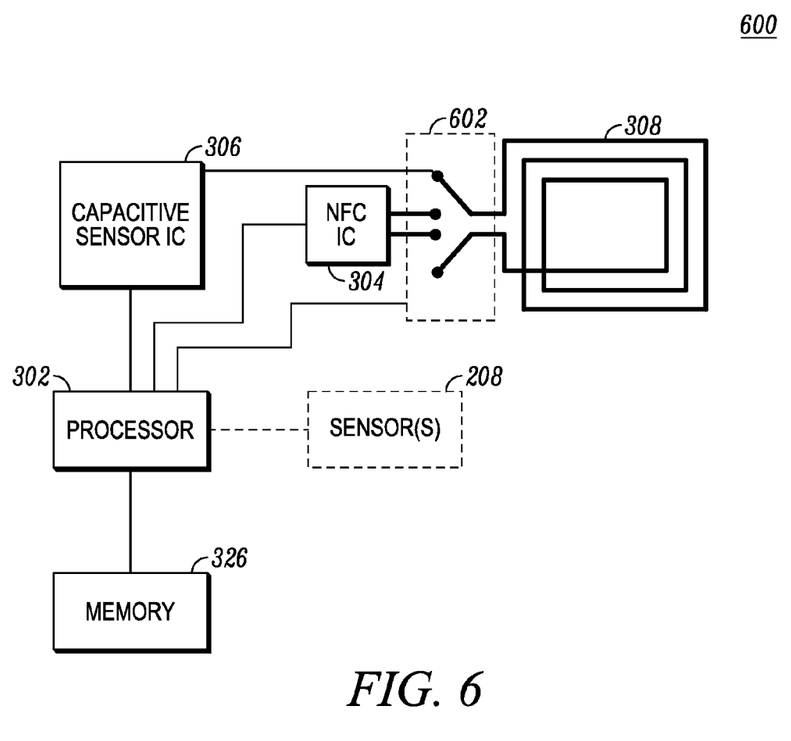
FIG. 6 is a schematic diagram illustrating another embodiment of a detection element in accordance with the present teachings.

For a second embodiment of the detection element 104 illustrated in FIG. 6, receiving the first data from the detection element 104 includes receiving the first data from the capacitive sensing integrated circuit 306 coupled to the near field communication antenna 308. Particularly, FIG. 6 shows apparatus 600, which includes the processor 302 coupled to the NFC IC 304 and to the capacitive sensor IC 306. The apparatus 600 further includes the NFC antenna 308 and includes a switching element or switch 602 coupled to the processor 302 and connected to the NFC antenna 308. The switching element 602 is configured to connect either the capacitive sensor IC 306 or the NFC IC 304 to the NFC antenna 308 under the control of the processor 302. In one implementation example, the switching element 602 is a metal-oxide semiconductor field effect transistor switch. Apparatus 600 also illustrates the processor 302 coupled to the memory 326 and optionally to the sensors 208.

Using the apparatus 600, the device 100 can perform the functionality shown in blocks 406 and 408 of flow diagram 400 as follows. The processor 302 provides a signal, such as a voltage signal, to the switching element 602 to switch the switching element 602 from the NFC IC 304 to the capacitive sensor IC 306. In an embodiment, the NFC antenna 308 incorporates or is otherwise combined with capacitive touch sensors to sense any objects positioned at the backside of the device 100 as reflected by a change in capacitance. The capacitive sensor IC 306 is configured to measure the capacitance, including changes in capacitance, of the NFC antenna 308 and provide first data to the processor 302. The capacitive sensor IC 306 could take a single measurement or could take multiple measurements over a designated time period, which are averaged to provide an average capacitance measurement. The first data indicates the one-handed operation when the measured capacitance is within a first range of capacitance values and can indicate another manner of operation of the device 100 when the measured capacitance is outside of the first range of capacitance values. For example, the first data could indicate the two-handed operation of the device 100 or operation of the device 100 when it is laying on a surface other than a person's hand when the measured capacitance is outside of the first range of capacitance values.

In one example implementation scenario, the capacitive sensor IC 306 determines, based on the value of the measured capacitance whether a user is performing a one-handed operation of the device, a two-handed operation of the device, or if the device is laying on another surface during operation. For instance, memory within or coupled to the capacitive sensor IC 306 stores a table or some other data structure having one or more ranges of capacitance values, wherein each range corresponds to a different manner of operating the device 100. Namely, a first range of capacitance values between 7 picofarads (pF) to 9 pF corresponds to the one-handed operation of the device 100. A second range of capacitance values between 5 pF to 7 pF could correspond to the two-handed operation of the device 100; and different ranges of capacitance values can be used to determine whether a user is holding and operating the device 100 with both hands or holding the device 100 with one hand and operating the device 100 with the other hand. A third range of capacitance values between 4 pF to 5 pF could correspond to the user operating the device 100 as it sits on a surface. Alternatively, the capacitive sensor IC 306 communicates data to the processor 302 that is mapped to a different range of values (1400 to 1800, 1000 to 1400, 800 to 1000, etc.).

Alternatively, upon measuring the capacitance of the NFC antenna 308, the capacitive sensor IC 306 sends the capacitance measurement, as the first data, to the processor 302. The processor 302 then uses the capacitance measurement to determine 408 whether there is a one-handed operation or otherwise of the device 100. To make the determination 408, the processor 302 uses, for instance, a table or some other data structure stored in the memory 326, which contains one or more ranges of capacitance values, wherein each range corresponds to a different manner of operating the device 100.

Returning again to the description of the method 400, optionally, the device 100 determines 420 a set of characteristics of the device 100 and determines 408, at least in part based on the set of characteristics of the device 100, whether there is the one-handed operation of the device 100. The set of characteristics can include, but need not be limited to, one or more of the following: an orientation of the device 100; a size of the device 100; a screen size of the device 100; or a location of the detection element 104 at the backside of the device 100. At least some of these characteristics can be stored in the memory 326. Moreover, the processor 302 can use a suitable algorithm to incorporate the effect of one or more of these characteristics into its determination 408 of the manner in which the device 100 is being held and/or operated.

In one example implementation, a combined processor 302 and memory 326 IC is manufactured such that it is configurable for different types of electronic devices having, for instance, different sizes, different screen sizes, and/or different placements of the detection element at the backside of the electronic device. The memory 326, accordingly, stores different tables with field strength or capacitance value ranges that correspond to different combinations of these characteristics. Alternatively, the memory 326 is loaded with the particular characteristics of a given device 100 during or after manufacture, wherein the processor 302 uses an algorithm to adjust a default table having field strength or capacitance value ranges, which is stored in the memory 326.

Moreover, as mentioned above, the device 100 can be configured with an orientation detection element coupled to the processor 302 and configured to determine an orientation of the electronic device 100. For example, the orientation element includes one or more sensors that are configured to determine whether the device is being held in a portrait orientation as shown in view 702 of FIG. 7 and 802 of FIG. 8 or in a landscape orientation as shown in view 902 of FIG. 9. The processor 302 is configured to determine whether there is a one-handed operation of the device 100 based on the orientation of the device 100. For instance, the first data might indicate a one-handed operation because of how the user is holding his fingers on the backside of the device 100. However, upon the orientation element detecting a landscape orientation of the device, the processor 302 instead determines 408 that a two-handed operation is being performed on the device 100.

Upon determining 408 a one-handed operation of the device 100, the processor 302 adjusts 414 a displaying of a GUI, for instance by adjusting the default GUI, on the electronic device 100. For one example implementation where the device 100 does not determine handedness, the processor 302 is configured to decrease a dimension of a standard GUI, which is illustrated by reference to views 1002 and 1006 shown in FIG. 10.

Figure 10:
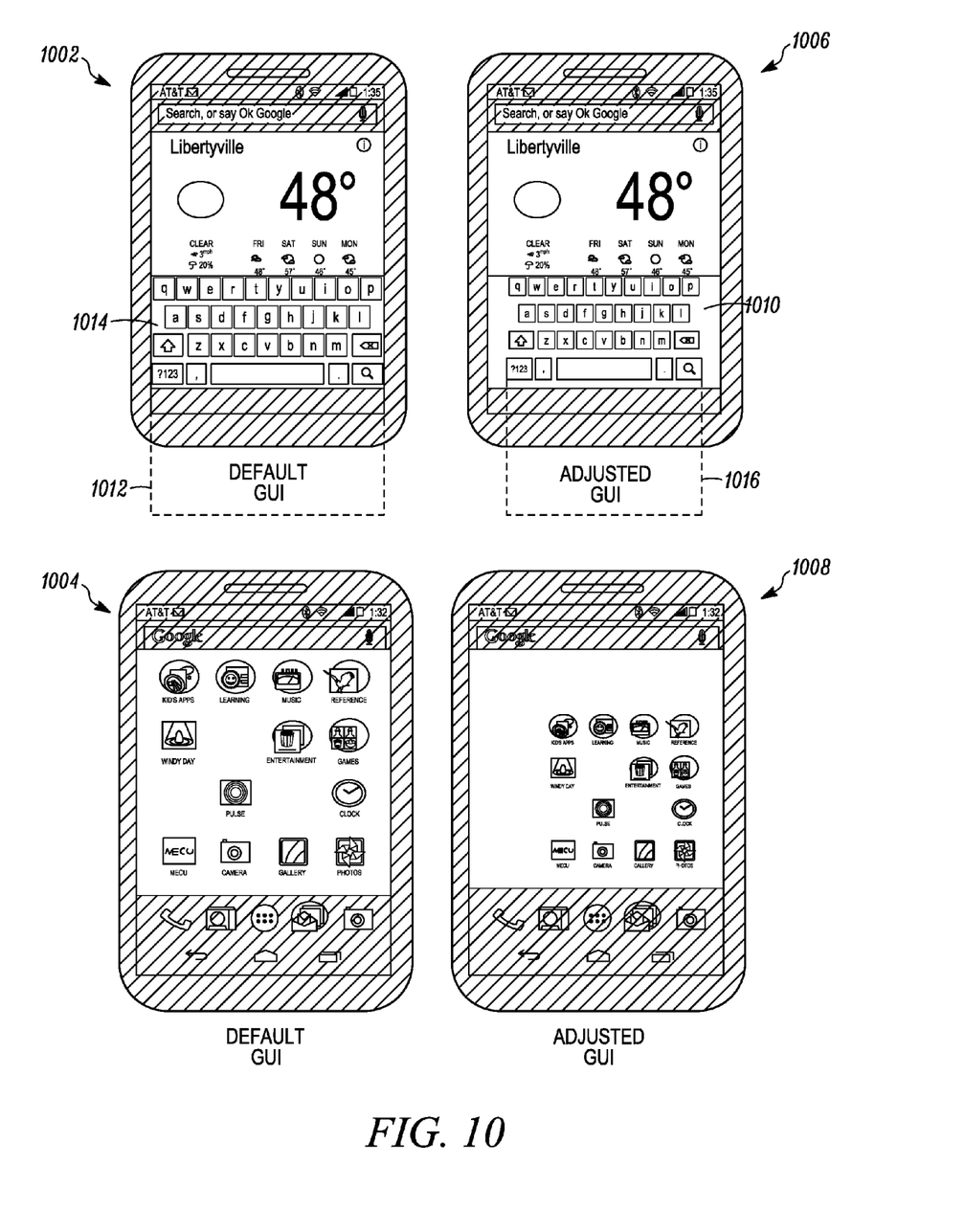
FIG. 10 illustrates adjusting a displaying of a graphical user interface in accordance with the present teachings.

As shown, a virtual keyboard 1014, which is an image of a keyboard displayed as a lower portion of a standard GUI, is compressed toward the center of a touchscreen. Accordingly, a width 1016 of a virtual keyboard 1010 of an adjusted GUI is decreased relative to a width 1012 of the keyboard 1014. In this example, only part of the standard GUI, namely the part that can be interacted with by the user, is adjusted. Images of an upper portion of the standard GUI remain unchanged. However, other images of the GUI such as an icon or some other area displayed on the touchscreen can have one or more of its dimensions reduced, by for instance being compressed such as being compressed toward the center of the touchscreen.

When a one-handed operation is determined 408, in some embodiments, the processor 302 receives 410 second data from one or more of the sensors 208 disposed on a periphery of the electronic device 100. For example, if the user is holding the electronic device 100 as shown in view 804 of FIG. 8, the sensors 810, 812 detect the presence of the users hand and/or arm. The sensors 810, 812 are disposed on the left side of the electronic device 100 when the electronic device 100 is face-up and viewed from a plan-view. Thus, an indication from theses sensors 810, 812 of the presence of a hand, arm or finger(s) suggests that the user is using the left hand when operating the electronic device 100. The processor 302 uses the second data information to determine 412 handedness, in this case right-handed operation of the electronic device. In a similar manner, the processor 302 is also configured to determine if a user is performing a one-handed operation with the left hand or left-handed operation.

Where handedness is determined 412, the device 100 can make further types of adjustments 414 to the GUI. For example, the processor can be configured to adjust the GUI displayed on the touchscreen by shifting a position of at least one of a keyboard, an icon, or another area of the graphical user interface. For one example, the GUI is adjusted by shifting, in at least one of a horizontal direction or a vertical direction, one or more of the keyboard, the icon, or another area displayed on a touchscreen of the electronic device.

For a particular illustration shown by reference to FIGS. 7 and 10, the device 100 determines 412 a right-handed operation of the device 100. Accordingly, a default GUI displayed on the touchscreen of the device shown in the view 1004 is shifted to the right as shown a view 1008. In this example, all of the icons of the GUI are capable of being interacted with by the user; so the entire GUI is shifted to the right to enable better accessibility of all of the icons to the user's hand. In this example, the entire GUI is shifted. However, in other example scenarios only a part of the GUI is shifted, for example by shifting a virtual keyboard to the right to accommodate a right-handed grip or operation of the device, while leaving other areas of images of the GUI unchanged. Similarly, the device can shift all or a portion of the GUI to the left upon determining 412 a left-handed operation of the device.

In a further embodiment, the device 100 is configured to determine or approximate, for instance using a camera and/or other sensors on the device, a length of the user's thumb and factor this into the GUI adjustments. This can be done, for example, by shifting the GUI or portions thereof horizontally or vertically and/or by changing a dimension or compressing one or more images of the GUI based on the thumb's reach. In yet another embodiment, the user controls through settings in a user profile in which direction and how much the GUI is adjusted when a one-handed operation is determined. These settings are also configurable depending on whether the processor 302 determines that the right or the left hand is performing the one-handed operation.

Returning again to the determination shown at 408 of FIG. 4, where a one-handed operation is not determined, the device 100 can simply display 404 the default GUI. However, in one optional implementation scenario where the device 100 initially determines a two-handed operation, the device (for instance using the processor 302) determines 416 whether at least one function, performed in relation to the electronic device, is detected, wherein the function indicates one-handed operation of the electronic device. Illustratively, detecting performance of the at least one function includes detecting contact to at least a first button on the electronic device. In a particular embodiment, the contact is detected within a time interval threshold of determining the two-handed operation. Moreover, a consequence of detecting the at least one function and due to inaccurately determining the two-handed operation, the processor 302 can further adjust a threshold value or a threshold range, e.g., of field strengths or capacitances stored in memory, to more accurately make future determinations 408 of one-handed operation.

In one example scenario, the processor 302 receives the first data from the NFC IC 304 and determines whether the first data is within a first range or a second range of field strength values. If the first data is within the second range of field strength values indicating a two-handed operation, the processor 302 starts a timer. If the user, for example, adjusts the volume control using the button 210 before the timer expires this indicates that the user is performing a one-handed operation, not a two-handed operation. Because the processor 302 has incorrectly determined a two-handed operation based on the current first range and second range of field strength values, the processor 302 adjusts 418 the threshold ranges for detecting one-handed and two-handed operation of the device.

In this example, the processor 302 incorrectly determined a two-handed operation because the first data was within the second range of field strength values. If the first range of sensed values is below 7 and the second range is above 8 this means that the processor 302 incorrectly determined a two-handed operation because the first and second range of field strength values are too low. Accordingly, the processor 302 illustratively raises the first and second range to 7.5 and 8.5 respectively to correct for the erroneous determination of a two-handed operation. After the adjustment is made the processor 302 continues further determinations associated with one-handed operation, such as, receiving 410 second data and determining 412 a left or right handed operation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    outputting, by an electronic device and for display, a graphical user interface;
    receiving, by the electronic device, from at least one sensor positioned at a backside of the electronic device, first data generated when at least a portion of a hand is positioned at the backside of the electronic device, wherein the at least one sensor includes a near-field communication antenna coupled to a switch that connects one of a near-field communication integrated circuit or a capacitive sensing integrated circuit to the near-field communication antenna, the near-field communication integrated circuit being configured to measure a field strength of the near-field communication antenna, and the capacitive sensing integrated circuit being configured to measure a capacitance of the near-field communication antenna;
    determining, by the electronic device and based on a comparison of the first data to a threshold value, whether the first data indicates a one-handed operation or a two-handed operation of the electronic device;
    responsive to determining that the first data indicates the two-handed operation of the electronic device, determining, by the electronic device, at least one function performed in relation to the electronic device that indicates the one-handed operation of the electronic device; and
    responsive to determining the at least one function that indicates the one-handed operation of the electronic device, adjusting, by the electronic device, the graphical user interface that is output for display by the electronic device.

2. The method of claim 1, wherein receiving the first data from the at least one sensor comprises receiving the first data from the near-field communication integrated circuit that is coupled to the near-field communication antenna via the switch.

3. The method of claim 2, further comprising:
initiating a diagnostic mode of the near-field communication integrated circuit,
wherein, while in the diagnostic mode, the near-field communication integrated circuit measures the field strength from the near-field communication antenna, and
wherein determining that the first data indicates the two-handed operation of the electronic device comprises determining that the measured field strength is outside of a first range of field strength values.

4. The method of claim 1, wherein receiving the first data from the at least one sensor comprises receiving the first data from the capacitive sensing integrated circuit that is coupled to the near-field communication antenna via the switch.

5. The method of claim 4, further comprising:
switching the switch from the near-field communication integrated circuit to the capacitive sensor integrated circuit,
wherein determining that the first data indicates the two-handed operation of the electronic device comprises determining that the measured capacitance is outside of a first range of capacitance values.

6. The method of claim 1, wherein determining the at least one function that indicates the one-handed operation comprises determining a contact to a button on the electronic device, wherein the contact is determined within a time interval threshold of determining that the first data indicates the two-handed operation.

7. The method of claim 1, further comprising:
responsive to determining the at least one function that indicates the one-handed operation, adjusting the threshold value to generate an adjusted threshold value;
after adjusting the threshold value, receiving, from the at least one sensor, further data generated when at least the portion of the hand is positioned at the backside of the electronic device; and
determining, based on a comparison of the further data to the adjusted threshold value, whether the further data indicates the one-handed or the two-handed operation.

8. The method of claim 1, wherein adjusting the graphical user interface comprises at least one of:
shifting, in at least one of a horizontal direction or a vertical direction, at least one of a keyboard, an icon, or an area displayed at a touchscreen of the electronic device; or
adjusting, by compressing toward a center of the touchscreen of the electronic device, at least one of the keyboard, the icon, or the area displayed at the touchscreen.

9. The method of claim 1, further comprising:
responsive to determining at least one of whether the at least one sensor is already in use or whether a wireless charging component is operating on the electronic device, outputting a default graphical user interface.

10. The method of claim 1, further comprising:
determining a set of characteristics of the electronic device; and
determining, based on the set of characteristics of the electronic device, whether there is the one-handed operation of the electronic device.

11. The method of claim 10, wherein the set of characteristics of the electronic device comprises at least one of:
an orientation of the electronic device;
a size of the electronic device;
a screen size of the electronic device; or
a location of the at least one sensor on the backside of the electronic device.

12. An electronic device, comprising:
at least one sensor disposed on a backside of the electronic device, wherein the at least one sensor is configured to generate first data in response to at least a portion of a hand being positioned at the backside of the electronic device, wherein the at least one sensor includes a near-field communication antenna coupled to a switch that is configured to connect one of a near-field communication integrated circuit or a capacitive sensing integrated circuit to the near-field communication antenna, the near-field communication integrated circuit being configured to measure a field strength of the near-field communication antenna, and the capacitive sensing integrated circuit being configured to measure a capacitance of the near-field communication antenna; and
a processor coupled to the at least one sensor, wherein the processor is configured to:
output, for display, a graphical user interface;
receive the first data;
determine, based on a comparison of the first data to a threshold value, whether the first data indicates a one-handed operation or a two-handed operation of the electronic device;
responsive to determining that the first data indicates the two-handed operation of the electronic device, determine at least one function performed in relation to the electronic device that indicates the one-handed operation of the electronic device; and
responsive to determining the at least one function that indicates the one-handed operation of the electronic device, adjust the graphical user interface that is output for display by the electronic device.

13. The electronic device of claim 12, wherein the switch is configured to connect the one of the capacitive sensing integrated circuit or the near-field communication integrated circuit to the near-field communication antenna under control of the processor.

14. The electronic device of claim 12, further comprising an orientation sensor coupled to the processor and configured to determine an orientation of the electronic device, wherein the processor is configured to determine whether there is the one-handed operation of the electronic device based on the orientation of the electronic device.

15. The electronic device of claim 12, further comprising a touchscreen coupled to the processor and configured to display the graphical user interface, wherein the processor is configured to adjust the graphical user interface output for display at the touchscreen by at least one of:
shifting a position of at least one of a keyboard, an icon, or an area of the graphical user interface; or
decreasing a dimension of at least one of the keyboard, the icon, or the area of the graphical user interface.

* * * * *